United States Patent
Monagle

(10) Patent No.: US 12,540,921 B2
(45) Date of Patent: Feb. 3, 2026

(54) FLAME IONIZATION DETECTOR IGNITION AID

(71) Applicant: Matthew Monagle, Salida, CO (US)

(72) Inventor: Matthew Monagle, Salida, CO (US)

( * ) Notice: Subject to any disclaimer, the term of this patent is extended or adjusted under 35 U.S.C. 154(b) by 553 days.

(21) Appl. No.: 18/093,556

(22) Filed: Jan. 5, 2023

(65) Prior Publication Data

US 2024/0230591 A1   Jul. 11, 2024

(51) Int. Cl.
| | | |
|---|---|---|
| G01N 21/64 | (2006.01) |
| C07F 5/02 | (2006.01) |
| C09B 57/00 | (2006.01) |
| C09K 11/06 | (2006.01) |
| G01N 15/10 | (2024.01) |
| G01N 15/1429 | (2024.01) |
| G01N 27/626 | (2021.01) |
| G01N 31/22 | (2006.01) |
| G01N 33/483 | (2006.01) |
| G01N 33/68 | (2006.01) |

(52) U.S. Cl.
CPC .................................. G01N 27/626 (2013.01)

(58) Field of Classification Search
CPC ..................................................... G01N 27/626
See application file for complete search history.

(56) References Cited

U.S. PATENT DOCUMENTS

2020/0408404 A1*  12/2020  Wiesenberg ......... F23M 11/042

FOREIGN PATENT DOCUMENTS

FR        1530453 A   *   6/1968

OTHER PUBLICATIONS

Deng, Chunhui, et al. "A novel miniaturized flame ionization detector for portable gas chromatography." Journal of chromatographic science 43.7 (2005): 355-357. (Year: 2005).*

* cited by examiner

*Primary Examiner* — Jennifer Wecker
*Assistant Examiner* — Oyeleye Alexander Alabi
(74) *Attorney, Agent, or Firm* — Wilcox & Myers, P.C.; Jeffrey D. Myers

(57) ABSTRACT

An ignition aid method and apparatus for a flame ionization detector, comprising a body that traverses a chimney of the detector to create turbulence in flow of gases flowing out of the detector to enhance commingling of the fuel/air mixture with an ignition source when the ignition source is active.

17 Claims, 4 Drawing Sheets

FLAME IONIZATION DETECTOR IGNITION AID

CROSS-REFERENCE TO RELATED APPLICATIONS

This application claims priority to and the benefit of the filing of U.S. Provisional Patent Application Ser. No. 63/296,557, filed on Jan. 5, 2022, and the specifications and claims thereof are incorporated herein by reference.

STATEMENT REGARDING FEDERALLY SPONSORED RESEARCH OR DEVELOPMENT

Not Applicable.

NAMES OF PARTIES TO JOINT RESEARCH AGREEMENT

Not Applicable.

REFERENCE TO A SEQUENCE LISTING, A TABLE, OR A COMPUTER PROGRAM LISTING COMPACT DISC APPENDIX

Not Applicable.

STATEMENT REGARDING PRIOR DISCLOSURES BY THE INVENTOR OR A JOINT INVENTOR

Not Applicable.

BACKGROUND OF THE INVENTION

Field of the Invention (Technical Field)

The present invention relates to flame ionization detectors used in gas chromatography, which require an ignition source to initiate the flame that will provide the detector signal. The present invention, of both an apparatus and a method, is designed to enhance the probability that the flame will be ignited when the detector begins a flame initiation procedure.

Description of Related Art

There are a number of references describing the gas chromatographic (GC) process. Flame ionization detectors (FID's) are widely used in gas chromatography to convert a chemical compound eluting from a column in a gas chromatograph into an electrical signal suitable for recording. Flame ionization detectors are commonly used GC detectors due to their linearity, sensitivity, and response to hydrocarbons. The flame ionization detector is based on a hydrogen/air flame that combusts hydrocarbons as they elute from a chromatographic column. The hydrocarbon combustion process generates ions and electrons in the flame that are measured with a picoammeter which can be recorded for further evaluation.

In order to initiate the flame in an FID, manufacturers utilize an ignition source such as a glow plug to provide the initial source to ignite the flame. In at least one case, the ignitor is threaded into the side of the detector until it is fully seated against a brass o-ring that contacts the side of the detector chimney (also known as a castle). When an operator wishes to ignite the detector, or the instrument senses a detector where the flame has gone out, a signal is sent to the glow plug ignitor to turn on. In addition, in at least one case, detector flows are ramped up to create a rich fuel/air mixture in order to enhance the ignition process. These steps are taken to ignite or re-ignite the flame in the FID.

It is often the case that this is insufficient to ignite the flame. Therefore, a procedure that is useful to aid in the ignition of the FID flame is to provide a low flow of air across the top of the detector chimney to create a turbulent flow within the chimney in order to enhance the commingling of the fuel gases with the hot glow plug. Currently, this process is done by an operator standing at the instrument and providing a puff of air across the top of the detector chimney. There are significant disadvantages to having to provide this type of enhancement to aid in flame ignition. First, it requires the operator to be present to re-ignite the flame when the instrument initiates an ignition procedure. If the flame goes out overnight while the instrument is in unattended operation, it is often the case that the automated re-ignition procedure will not succeed and the balance of analysis may be lost. In addition, while it is possible to safely provide the low flow of air across the detector chimney, there are times when the ignition process will ignite in such a manner as to lead a flame to exit the chimney region. If the operator is not careful to avoid this ignition flame, it is possible for the operator will be singed by the ignition process especially if the operator is over the chimney at all. Finally, in practical operation, when it is difficult to ensure that a flame will auto-ignite, many laboratories will leave an unused detector lit so that when they need to switch to the unused channel the detector is known to be lit. This need to leave a detector lit means that the instrument is consuming gases (hydrogen and air) while that channel is not being used simply to ensure that the flame is lit when it is necessary to use the channel.

BRIEF SUMMARY OF THE INVENTION

The present invention is of an ignition aid apparatus for a flame ionization detector, comprising a body that traverses a chimney of the detector to create turbulence in flow of gases flowing out of the detector to enhance commingling of the fuel/air mixture with an ignition source when the ignition source is active. In an embodiment, the apparatus additionally comprises one or more of a bolt and/or a rod connected to the body. Preferably, at least a portion of the rod is threaded, with the rod extending from an exterior of the body into an interior of the body. The body is preferably hollow, and most preferably comprises at least two sections having differing interior dimensions. The body can remain in place except when it is necessary to measure flows or perform maintenance on the detector. The apparatus does not require operator intervention in order to enhance probability of flame ignition, does not alter the chimney in a manner that hinders existing functions of the detector, and does not require additional pneumatics or electronics to be installed on the detector.

The present invention is also of a method of enhancing probability of ignition in a flame ionization detector, comprising: providing a body in a chimney of the detector and disturbing flow near an ignition source of the flame ionization detector, thereby ensuring ignition of a flame in the detector when an ignitor is active. In an embodiment, the disturbing step occurs automatically. The body preferably additionally comprises one or more of a bolt and/or a rod connected to the body. Preferably, at least a portion of the rod is threaded and the rod extends from an exterior of said body into an interior of the body. The body is preferably hollow, and most preferably comprises at least two sections having differing interior dimensions.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

To preclude the need for manual intervention and to increase the reliability of auto-ignition in the ignition of FID flames, the present invention provides a means of consistently directing at least a portion of the fuel/air mixture towards the glow plug. The current invention creates a turbulent flow in the fuel/air mixture in the region of the glow plug so that ignition occurs in a substantially more reliable manner without operator intervention. This enhancement is provided by placing a partial obstruction in the fuel/air pathway adjacent to the glow plug. With this invention, ignition or re-ignition is much more reliable and the need for operator intervention is considerably reduced.

Figure 1:
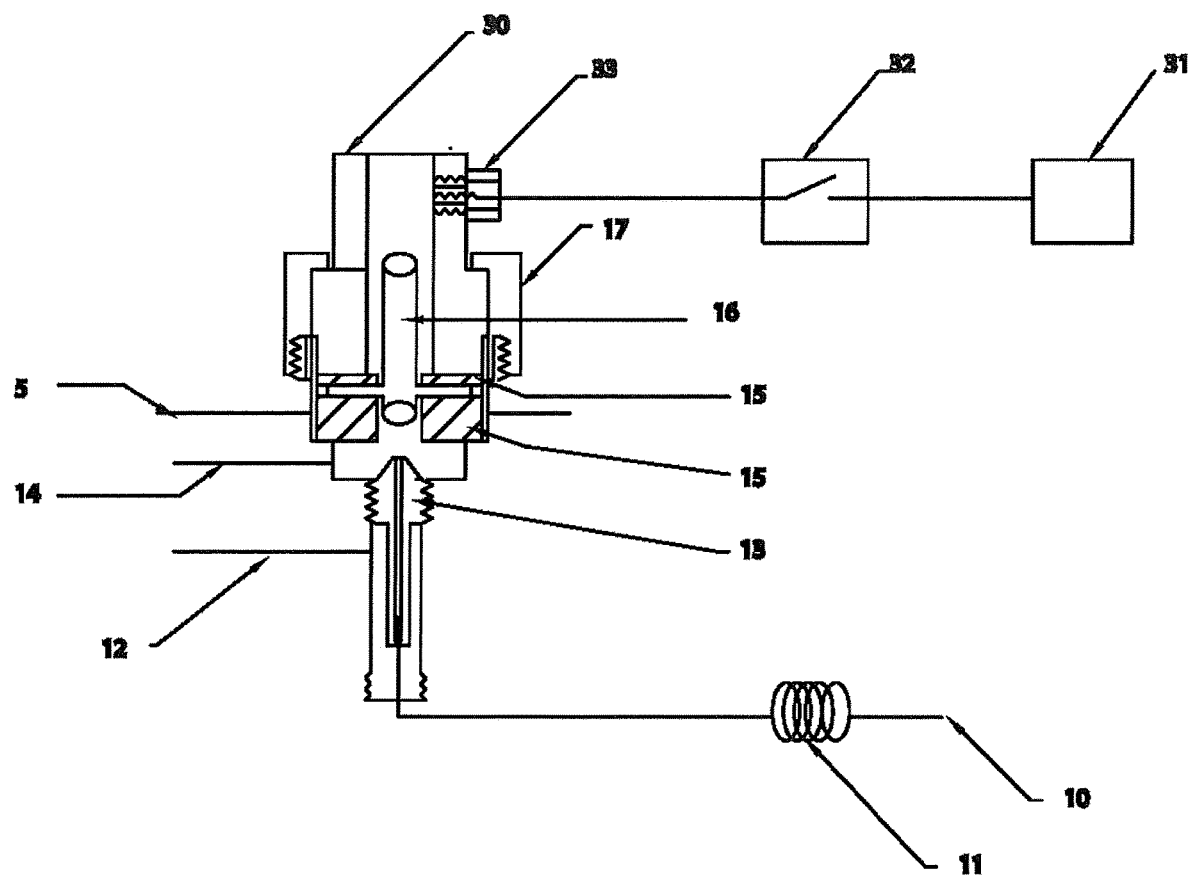
FIG. 1 is a prior art example of a flame ionization detector that uses a glow plug in the chimney of a flame ionization detector to ignite the flame.

FIG. 1 is an example of a flame ionization detector of prior art. The process of gas chromatography is laid out in the references provided. Briefly, in a gas chromatograph, the carrier gas 10 coming from the chromatographic column 11 is directed to the detector which is typically in the upper wall 15 of the chromatographic oven. Once at the detector, the carrier flow is combined with the fuel gas (hydrogen) 12 and transported into the main chamber of the detector through a small orifice known as a jet 13. In the main detector chamber, the mixture of hydrogen/carrier gas is mixed with air 14 supplied at the base of the detector and flows up through the detector collector 16 which is isolated from the body of the detector by insulators 15, When in operation, a flame will exist at the exhaust tip of the jet. This flame will destroy hydrocarbon compounds and create ions and electrons that can be amplified by a picoammeter (not shown) in order to generate the analytical signal. The flame is typically self-sustaining at the tip of the jet once it has been ignited.

In order to initiate a flame that is the basis of the flame ionization detector, the carrier/fuel/air mixture is exposed to an ignition source such as an energized glow plug 33 typically screwed into the wall of the chimney 30. During ignition, the glow plug provides the initial energy to the carrier/fuel/air mixture to ignite. The glow plug is switched 32 on and energized by a voltage source 31. As noted above, once ignition is achieved, the flame is typically self-sustaining and the glow plug is typically turned off.

As shown in FIG. 1, the glow plug is slightly recessed from the inner diameter of the chimney and located above the collector. The advantage of having the ignition source above the collector is that there will be no disturbance of flow near the collector which could be a source of noise in the detector. However, if the flow coming up the chimney is not turbulent, it is possible that the electrons emitted from glow plug will not interact with the fuel/air mixture sufficiently to initiate a flame when the glow plug is on. In order to improve the possibility of ignition, the flows are sometimes ramped in order to create a rich fuel/air mixture in an attempt to enhance the probability of ignition.

The chimney in this type of FID is held in place by a threaded collar 17 which is screwed down to the base of the detector. This allows the chimney to be removed to access the jet for repair if necessary.

Figure 2:
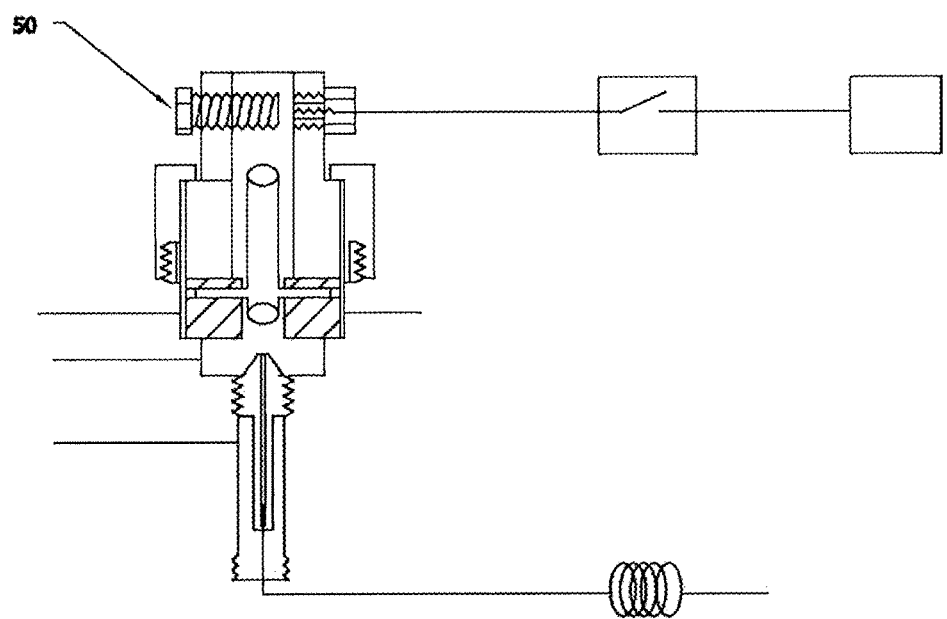
FIG. 2 illustrates a modification of the chimney according to the present invention.

FIG. 2 is the ignition aid set forth in this patent. The majority of the detector is unchanged. Adjacent to the glow plug a bolt or rod 50 is a threaded into the chimney and situated proximal to the end of the glow plug. This bolt causes enough perturbation in the flow of the detector gases that when a flame initiation sequence is invoked a portion of the fuel/air mixture is substantially more likely to interact with the electrons emitted from the glow plug and initiate a flame. Using a threaded bolt allows the operator to easily remove the bolt if there is a need to measure flow rates in the chimney using the current technique but still allow the bolt to be replaced back in its original position. In addition, a threaded bolt allows the operator to remove the bolt in order to slide the threaded collar up or down the chimney as needed for maintenance.

Figure 3:
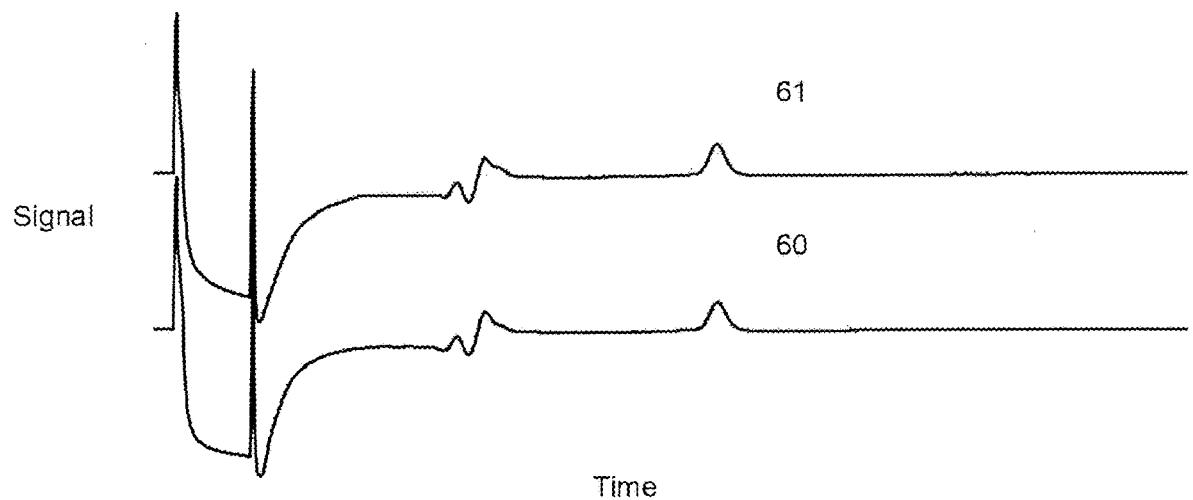
FIG. 3 is a magnified view of the detector signals where the column effluent was split evenly to a detector without the ignition aid and a detector with the ignition aid. This view demonstrates that the detector aid has no significant effect on the detector noise level.

It should be noted that the location of the ignition aid is well above the collector of the detector and therefore the turbulence created by this aid does not have a significant effect on the noise of the detector. This is demonstrated in FIG. 3. The terminal end of an analytical column was split with a T-connection and the exhaust from the column was transferred in an approximately equal manner between a detector without an ignition aid 60 and a detector with an ignition aid 61. The two signals yield substantially the same noise levels between the two detectors.

Figure 4:
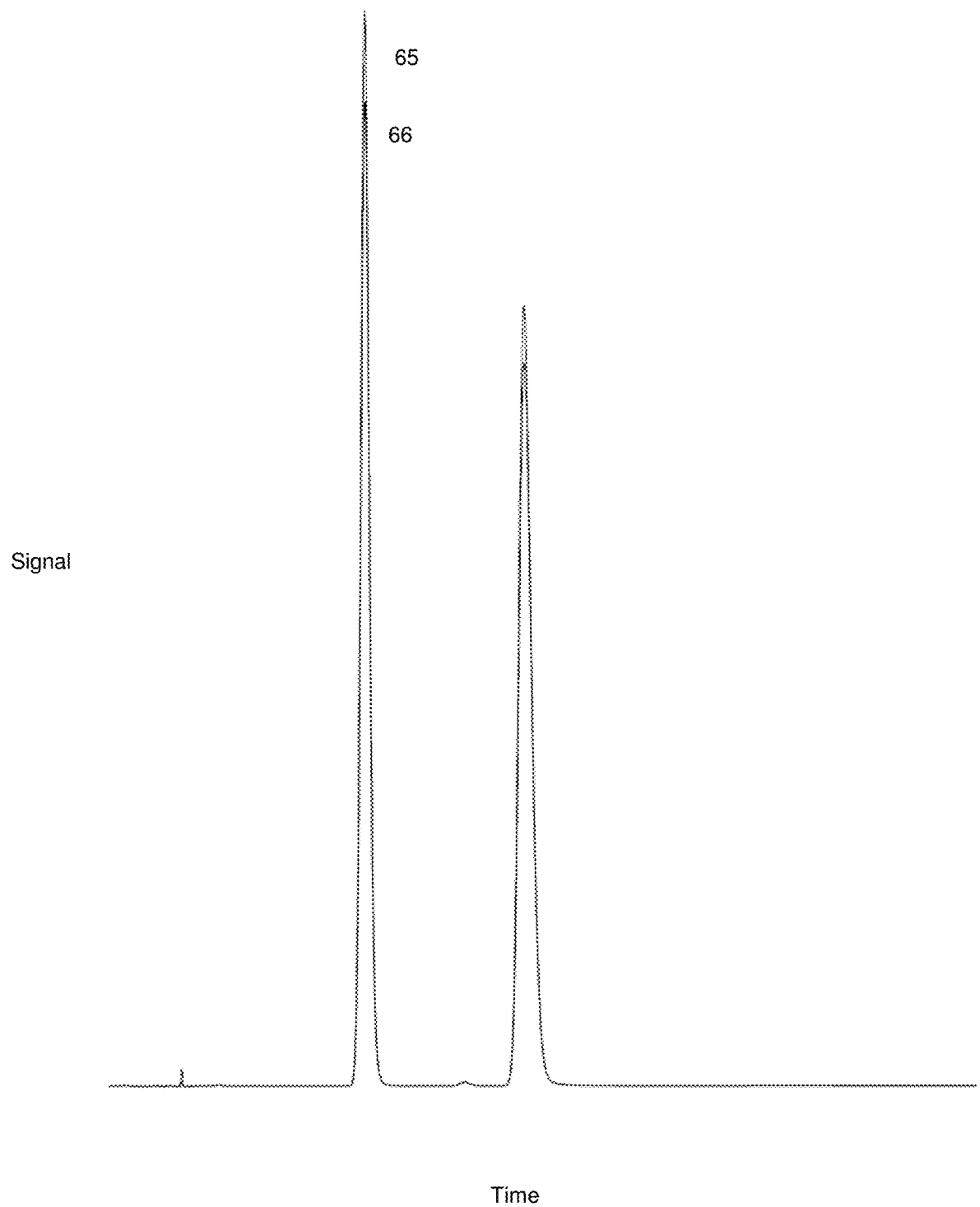
FIG. 4 is a chromatogram of the detector signals for a hydrocarbon sample injection where the column effluent was split evenly between a detector without the ignition aid and a detector with the ignition aid. This view demonstrates that the detector aid has no significant effect on the detector response to hydrocarbons.

It should also be noted that the location of the ignition aid does not interfere with the normal operation of the detector since it is located above the collector where the signal is obtained so the ignition aid does not have a significant effect on the sensitivity of the detector. This is demonstrated in FIG. 4. Using the same configuration as FIG. 3, a sample containing two hydrocarbon species was injected into the column. The upper trace 65 is a chromatogram of a hydrocarbon mixture eluting through an FID without an ignition aid while the lower chromatogram 66 is the same mixture eluting through an FID with an ignition aid. The two signals yield substantially the same response levels between the two detectors.

A significant advantage of the ignition aid as contrasted with, for example, moving the glow plug in line with the fuel gases, is that the bolt will not suffer from adverse consequences from the moisture generated by the hydrogen/air flame whereas a glow plug that rusts will become inoperable. In addition, the ignition aid does not require moving the glow plug from its original position which might require additional wiring and could alter the resistance of the circuit and create an error in the glow plug electrical circuit. Finally, the balance of the detector structure and operation is largely unchanged by the ignition aid.

In order to evaluate the effectiveness of the ignition aid, a series of 10 ignitions were performed on the un-aided (prior art) detector in the front and the aided detector in the back at five minute intervals. Flow settings (30 mL hydrogen/300 mL air) were identical for both detectors and each detector was at 220 degrees Celsius. Table 1 below are the results of the ten ignition cycles with and without the ignition aid. None of the ignition cycles with or without the ignition aid were provided with the additional low flow across the top. All of the ignition cycles in the table utilized the ramped flow rates to the detectors. It is evident that the success of the ignition cycle is substantially increased on the detector with the ignition aid.

The front detector (prior art) was then told to ignite five times with the assistance of an external flow of air across the top provided by a technician and lit all five times demonstrating that the detector was not fundamentally flawed.

The experiment was repeated with the detector temperatures at 250 degrees Celsius and flow rates of 35 mL of hydrogen and 350 mL of air. The results were identical, zero ignitions over ten attempts for the unaided detector and ten ignitions for ten attempts for the detector with the ignition aid. The only difference in the two experiments was the average signal for the aided detector was 12.1 due to the higher air flow through the detector.

Several positions on the radius of the chimney were tried and not found to have changed the effectiveness of the ignition aid of the invention as long as the ignition aid terminates near the ignitor.

TABLE 1

| Time | Front Detector (prior art) Successful Y/N (signal) | Back Detector (w/ignition aid) Successful Y/N (signal) |
| --- | --- | --- |
| 1 | N (0.0) | Y (11.2) |
| 2 | N (0.0) | Y(11.1) |
| 3 | N (0.0) | Y(9.6) |
| 4 | N (0.0) | Y(9.5) |
| 5 | N (0.0) | Y(9.3) |
| 6 | N (0.0) | Y(9.5) |
| 7 | N (0.0) | Y(9.5) |
| 8 | N (0.0) | Y(9.6) |
| 9 | N (0.0) | Y(9.6) |
| 10 | N (0.0) | Y(9.4) |

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. An ignition aid apparatus for a flame ionization detector in which an ignitor does not reside directly in a fuel/air stream, wherein said apparatus comprises a body that traverses a chimney of the detector to create turbulence in flow of gases flowing out of the detector to enhance commingling of a fuel/air mixture with an ignition source when the ignition source is active.

2. The ignition aid apparatus according to claim 1 wherein said body comprises one or more of a bolt and/or a rod connected to said chimney.

3. The ignition aid apparatus according to claim 2 wherein at least a portion of said bolt and/or rod is threaded.

4. The ignition aid apparatus according to claim 2 wherein said bolt and/or rod extends from an exterior of said chimney into an interior of said chimney.

5. The ignition aid apparatus according to claim 1 wherein said body is hollow.

6. The ignition aid apparatus according to claim 5 wherein said body comprises at least two sections having differing interior dimensions.

7. The ignition aid apparatus according to claim 1 wherein said body can remain in place except when it is necessary to measure flows or perform maintenance on the detector.

8. The ignition aid apparatus according to claim 1 that does not require operator intervention in order to enhance probability of flame ignition.

9. The ignition aid apparatus according to claim 1 that does not alter the chimney in a manner that hinders existing functions of the detector.

10. The ignition aid apparatus according to claim 1 that does not require additional pneumatics or electronics to be installed on the detector.

11. A method of enhancing probability of ignition in a flame ionization detector in which an ignitor does not reside directly in a fuel/air stream, the method comprising the steps of:
   providing a body in a chimney of the detector; and
   by means of the body, disturbing flow near an ignition source of the flame ionization detector;
   thereby ensuring ignition of a flame in the detector when an ignitor is active.

12. The method of claim 11 wherein the disturbing flow step occurs automatically.

13. The method of claim 11 wherein the body comprises one or more of a bolt and/or a rod connected to the chimney.

14. The method of claim 13 wherein at least a portion of the bolt and/or rod is threaded.

15. The method of claim 13 wherein the bolt and/or rod extends from an exterior of the chimney into an interior of said chimney.

16. The method according to claim 11 wherein the body is hollow.

17. The method according to claim 16 wherein the body comprises at least two sections having differing interior dimensions.

* * * * *